United States Patent

[11] 3,600,679

| [72] | Inventor | William Frank Hill<br>Stafford, England |
|---|---|---|
| [21] | Appl. No. | 841,255 |
| [22] | Filed | July 14, 1969 |
| [45] | Patented | Aug. 17, 1971 |
| [73] | Assignee | Joseph Lucas (Industries) Limited<br>Birmingham, England |
| [32] | Priority | July 29, 1968 |
| [33] |  | Great Britain |
| [31] |  | 36,026/68 |

[54] MAXIMUM ACCELERATION OR DECELERATION METER FOR A ROAD VEHICLE
1 Claim, 2 Drawing Figs.

| [52] | U.S. Cl. | 324/162 |
|---|---|---|
| [51] | Int. Cl. | G01p 3/42 |
| [50] | Field of Search | 324/70, 69, 103, 119; 340/262 |

[56] References Cited
UNITED STATES PATENTS

| 2,947,502 | 8/1960 | Highley | 324/70 uX |
| 3,040,586 | 6/1962 | Staff | 73/492 |
| 3,469,662 | 9/1969 | Dewar | 324/70 X |

OTHER REFERENCES

An electronic Tachometer, Accelerometer and Vibrometer— Electronics— June 1944,— pp.100— 104, 310, 312.

*Primary Examiner*—Michael J. Lynch
*Attorney*—Holman and Stern

ABSTRACT: A meter for indicating the acceleration of a road vehicle has a speed-sensing means which produces an electrical signal representing the speed of the vehicle. This signal is then applied to a differentiating circuit, and the output from the differentiating circuit whereby the indicator reads the maximum acceleration or the maximum deceleration depending on the position of the switch means is applied to an indicator. The acceleration can be a positive acceleration or a negative acceleration.

MAXIMUM ACCELERATION OR DECELERATION METER FOR A ROAD VEHICLE

This invention relates to acceleration meters for road vehicles.

An acceleration meter according to the invention includes speed-sensing means for producing an electrical signal representing the speed of the vehicle, a differentiating circuit to which the signal is applied, and an indicator to which the output from the differentiating circuit is applied to indicate the acceleration.

It will be appreciated that the acceleration can be positive or negative.

Figure 1:
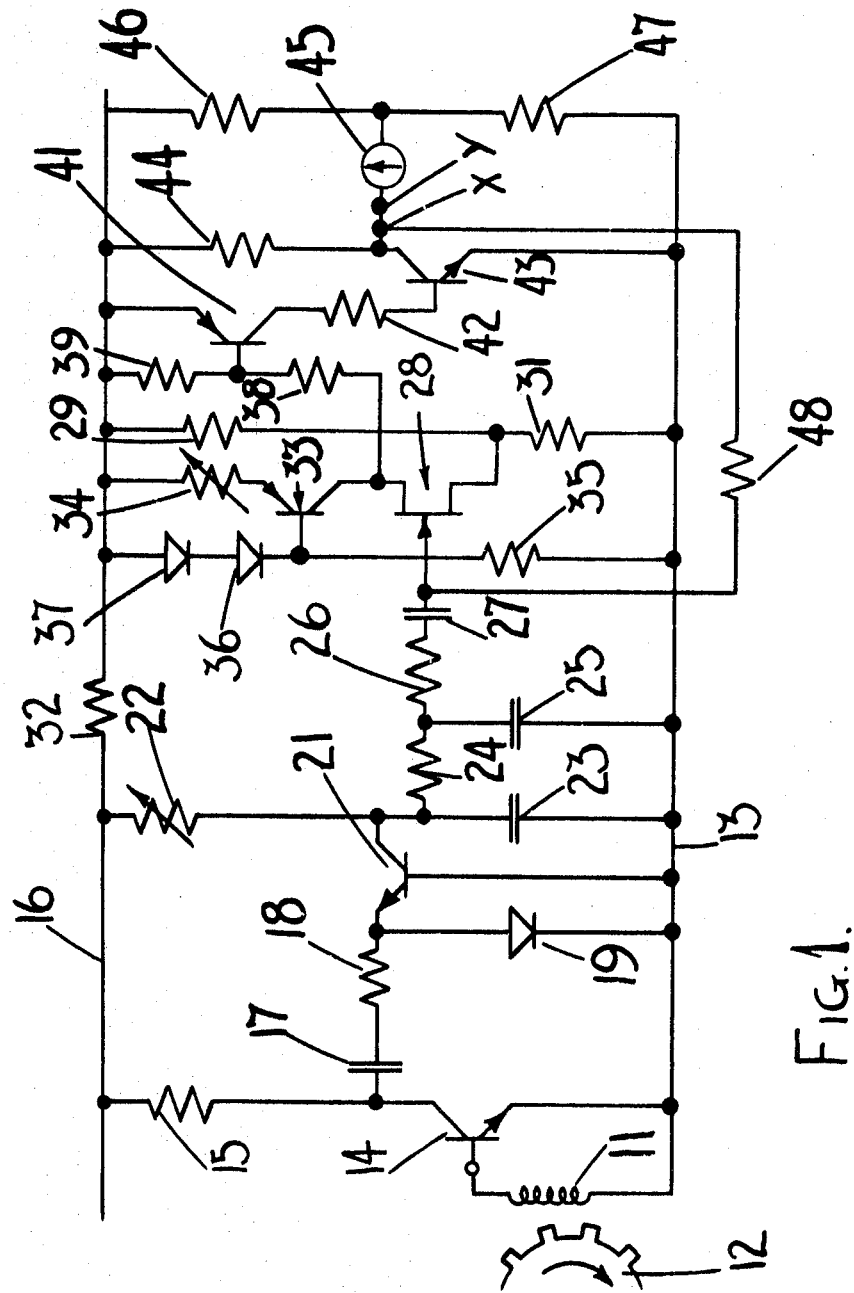
Figure 2:
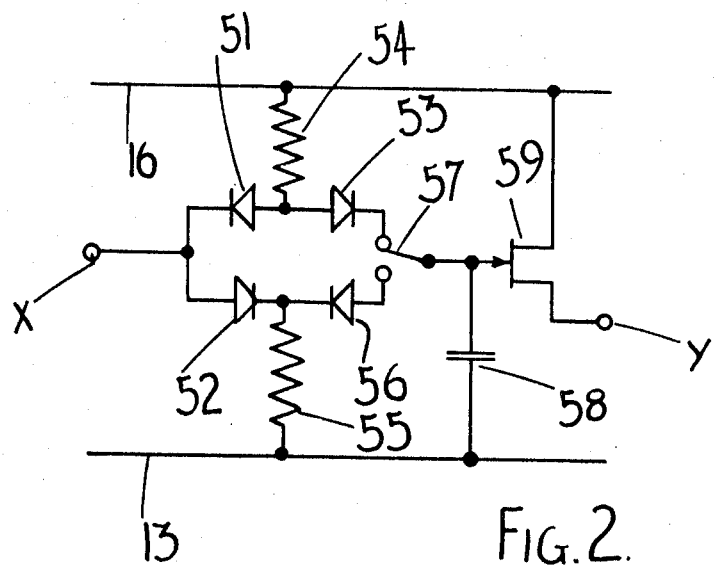

An example of the invention is illustrated in the accompanying drawings, in which FIG. 1 is a circuit diagram of an acceleration meter, and FIG. 2 illustrates a further circuit arrangement which can be incorporated in FIG. 1 to give a reading of maximum or minimum acceleration.

Referring to the drawing, a pickup winding 11 is positioned close to the teeth of the crown wheel 12 of the differential gear of the vehicle to provide in the winding 11 pulses at a frequency dependent on the speed of the vehicle. One end of the winding 11 is connected to a negative supply line 13, which may be grounded, and its other end is connected to the base of an n-p-n transistor 14 having its emitter connected to the line 13 and its collector connected through a resistor 15 to the positive supply line 16, with the lines 16 and 13 being connected to the vehicle battery. The collector of the transistor 14 is connected to the line 13 through a capacitor 17, a resistor 18 and a diode 19 in series, and the junction of the resistor 18 and diode 19 is connected to the emitter of a p-n-p transistor 21, the base of which is connected to the line 13, and the collector of which is connected to the junction of a variable resistor 22 and a capacitor 23 connected in series between the lines 16, 13. The junction of the resistor 22 and capacitor 23 is connected to the line 13 through a resistor 24 and capacitor 25 in series, with the junction of the resistor 24 and capacitor 25 being connected through a resistor 26 and capacitor 27 in series to the gate of a field effect transistor 28 having its source connected to the junction of a pair of resistors 29, 31 connected in series with a resistor 32 between the lines 16, 13. The drain of the transistor 28 is connected to the collector of an n-p-n transistor 33, the emitter of which is connected to the line 16 through a variable resistor 34 and the resistor 32 in series, and the base of which is connected to the line 13 through a resistor 35, and to the line 16 through a pair of diodes 36, 37 and resistor 32 in series. The collector of the transistor 33 is further connected to the line 16 through a pair of resistors 38, 39 and the resistor 32 in series, and the junction of the resistors 38, 39 connected to the base of an n-p-n transistor 41, the emitter of which is connected to the line 16 through the resistor 32 and the collector of which is connected through a resistor 42 to the base of an n-p-n transistor 43, the emitter of which is connected to the line 13 and the collector of which is connected to the line 16 through a resistor 44 and the resistor 32 in series. The collector of the transistor 43 is connected through an indicating instrument 45 to the junction of a pair of resistors 46, 47 connected in series with the resistor 32 between the lines 16, 13, and the collector of the transistor 43 is further connected through a resistor 48 to the gate of the transistor 28.

In operation, pulses are produced in the winding 11 at a frequency dependent on the speed of the vehicle, and the transistor pump circuit including the capacitors 17, 23, the diode 19 and transistor 21 operates in known manner to produce across the capacitor 23 a voltage proportional to the speed of the vehicle. This voltage is smoothed by the resistor 24 and capacitor 25, and differentiated by the capacitor 27 to provide an input signal to the amplifier constituted by the transistors 28, 33, 41 and 43 and their associated components. The input signal to the amplifier will represent rate of change of speed of the vehicle, which can of course be positive or negative. The amplifier is provided with negative feedback by way of the resistor 48, and has a high input impedance. The transistor 33 acts as a constant current source for the transistor 28, with temperature compensation provided by the diodes 36 and 37. The output from the amplifier is fed to the instrument 45, which gives a reading representing either acceleration or deceleration.

Referring now to FIG. 2, it may be that in some circumstances the instrument is required to read the maximum acceleration that has been obtained, or alternative the maximum deceleration. In such a case, the arrangement shown in FIG. 2 is incorporated in the circuit at the points X—Y shown in FIG. 1. The terminal X is connected to the cathode of a diode 51 and to the anode of a diode 52, the anode of the diode 51 being connected to the anode of the diode 52 and further being connected through a resistor 54 to the line 16. The cathode of the diode 52 is connected through a resistor 55 to the line 13, and is further connected to the cathode of a diode 56. A switch 57 is provided which can be engaged alternatively with the cathode of the diode 53 or the anode of the diode 56, the switch 57 being connected through a capacitor 58 to the line 13 and further being connected to the gate of a field effect transistor 59, the drain of which is connected to the line 16 and the source of which is connected to the terminal Y.

Assuming that maximum acceleration is to be noted on the instrument 45, then the switch 57 is moved to the position in which it completes a circuit to the cathode of the diode 53. The capacitor 58 can now charge to the potential at the anode of the diode 53, less the voltage drop across the diode 53. This potential is determined by the potential at terminal X, and during acceleration any increase in potential at the anode of the diode 53 will result in further charging of the capacitor 58. However, any decrease will not be effected to discharge the capacitor 58, because the diode 53 prevents such discharge. Thus, the potential across the capacitor 58 will represent the potential which occurs at maximum acceleration. Discharge of the capacitor through the transistor 59 is of course minimized by using a field effect transistor having a high input impedance.

Where maximum deceleration is being tested, then the switch 57 completes a circuit to the anode of the diode 56. The capacitor 58 can now discharge but not charge, and so the voltage across the capacitor 58 will be the lowest voltage which occurs at the cathode of the diode 56.

Having thus described my invention what I claim as new and desire to secure by Letters Patent is:

1 A maximum acceleration or deceleration meter for a road vehicle, including speed-sensing means for producing an electrical signal representing the speed of the vehicle, a differentiating circuit to which the signal is applied, said differentiating circuit producing an output representing the rate of change of speeds of the vehicle, a capacitor, manually operable switch means coupling said capacitor to said differentiating circuit, a diode circuit between the differentiating circuit and the manually operable switch means, said switch means having a first position in relation to the diode circuit in which said capacitor responds only to an output from the differentiating circuit representing acceleration of the vehicle, and so a voltage is developed across said capacitor representing the maximum acceleration of the vehicle, and said switch means having a second position in relation to the diode circuit in which said capacitor responds only to an output from the differentiating circuit representing deceleration of the vehicle, and so a voltage is developed across said capacitor representing the maximum deceleration of the vehicle, an indicator for providing a measure of the voltage developed across the capacitor which is proportional to the maximum acceleration of deceleration, and a circuit having a high input impedance coupling said capacitor to said indicator whereby said indicator reads the maximum acceleration or the maximum deceleration depending on the position of the switch means.